3,511,807
COUPLING POLYMERIZATION OF LOW MOLECULAR WEIGHT POLYAMIDE-ACIDS TO PRODUCE HIGH MOLECULAR WEIGHT POLYIMIDES
Elwyn Raymond Lovejoy, Hockessin, Del., assignor to E. I. du Pont de Nemours and Company, Wilmington, Del., a corporation of Delaware
No Drawing. Filed June 11, 1968, Ser. No. 735,962
Int. Cl. C08g 20/32
U.S. Cl. 260—47                    10 Claims

ABSTRACT OF THE DISCLOSURE

Process of producing coalescible powders of high molecular weight aromatic polyimides or copolyimides by forming a solution of a tetracarboxylic dianhydride or diamine, or low molecular weight polyamide acid containing an excess of either diamine or tetracarboxylic dianhydride; followed by continuously imidizing said polyamide acid in the presence of either a diamine or tetracarboxylic dianhydride whichever was either not present or formed the minor constituent in the polyamide-acid so as to avoid having to handle the extremely viscous solutions which high molecular weight polyamide-acids form.

BACKGROUND OF THE INVENTION

In the past, coalescible powders of high molecular weight polyimides have been made from aromatic polyamide-acids either by chemical conversion such as described in U.S. Pat. No. 3,179,631, issued Apr. 20, 1965, to A. L. Endrey, or by amine-catalyzed thermal conversion such as described in U.S. Pat. No. 3,249,588, issued May 3. 1966, to W. G. Gall. Both of these processes involve formation of high molecular weight precursor polymer, a polyamide-acid, solution of which are generally extremely viscous. If a solution containing 15 percent of dissolved aromatic polyamide-acid solids in pyridine is made, it becomes necessary to limit the molecular weight of the polyamide-acid in order to maintain the solution viscosity at a practical level such as by using an excess of one monomer or by incorporating a chain terminating compound such as aniline or phthalic anhydride.

Studies have shown that the toughness of coalesced polyimide powders depends to a large degree on the molecular weight of the precursor polyamide-acid. Thus, in order to produce higher molecular weight polyimides it is necessary to invest in special equipment to handle the very viscous solutions or else reduce the solids level of polyamide-acid in the solution. Either choice is undesirable economically.

It has now been found that a low or intermediate molecular weight polyamide-acid precursor can be converted into polyimide powder which on fabrication produces coalesced articles having physical properties characteristic of much higher molecular weight polyamide-acid precursors. The process involves the polymerization of an aromatic tetracarboxylic dianhydride and an aromatic diamine to a low or intermediate molecular weight polyamide-acid. The molecular weight is kept low by using a large excess of one monomer. Generally, this excess is at least 2 mole percent as based on the other monomer and preferably at least 5 mole percent as based on the other monomer. By using a 100 mole percent excess and then adding a different minor component monomer a reasonably regularly alternating copolymer can be obtained. Normally, it is preferred to use an excess of the diamine due to the moisture sensitivity of the anhydride end groups which result when the tetracarboxylic dianhydride is used as the excess monomer. Thus, trace amounts of moisture in the solvent would reduce the ability of the polyamide-acid to undergo the coupling reaction by removing the reactive anhydride end groups. The polyamide-acids may readily be prepared by the technique set forth in Edwards' U.S. Pat. No. 3.179,614, issued Apr. 20, 1965. The inherent viscosity of the polyamide-acid should be from 0.1 to 1 as measured from a 0.5 wt. percent solution in pyridine at 35° C. In the process of the present invention the polyamide-acid is pumped into the imidizer which preferably contains refluxing pyridine to be converted via the amine catalyzed thermal conversion process to a polyimide powder. Alternatively, the imidizer may contain other solvents for the polyamide-acid such as N,N-dimethylacetamide or N-methylpyrrolidone, along with a tertiary amine having a basic ionization constant $K_B$ of greater than about $1 \times 10^{-10}$. The use of poor solvents such as benzene, dioxane and xylene in combination with good solvents is also within the scope and purview of the invention. The use of a cosolvent which is a poor solvent for the final polyimide will assist in the precipitation of the more soluble polyimides and will result in a shorter reaction time. Simultaneously with pumping the polyamide-acid into the imidizer, a solution of the monomer used in more limited quantity in preparing the polyamide-acid or a low molecular weight polymer with the same end groups as the monomer is pumped into the imidizer at a rate relative to that for the polyamide-acid to maintain the overall ratio of anhydride to amine groups present in the imidizer within 1.5 percent of 1:1 at all times. Pyridine or another solvent such as N,N-dimethylacetamide, N-methylpyrrolidone, or acetone which does not affect the imidization reaction may be used as solvents or cosolvents for the monomer. Generally, the monomer solution is as concentrated as possible consistent with ease of handling. If copolymers are desired, a different specific monomer of the required type, amine or anhydride, can be employed for the coupling reaction.

Once in the imidizer the added monomer reacts with the end groups of the low molecular weight polyamide acid to couple the polyamide-acide molecules by forming additional amide acid groups. The amide acid groups are converted to imide groups via elimination of water. Once the degree of imidization becomes sufficiently great to overcome the solubilizing effect of the remaining amide acid groups a powder which is predominantly polyimide precipitates.

Suitable control of the pumping rates of the two streams to the imidizer can result in a polyimide having a close to stoichiometric ratio of monomers.

Unless care is taken during the imidization reaction some of the anhydride groups can react with the water formed during imidization. This undesirable side reaction can be reduced to a minimum by the use of a slight excess of the tetracarboxylic dianhydride when this is the limited monomer or by azeotropic distillation of water from the imidizer during the precipitation of the polyimide. The latter procedure is preferred.

The diamines useful in the present invention generally have the structural formula $H_2N—R_1—NH_2$ wherein $R_1$ is an arylene radical. Preferred arylene radicals for —$R_1$— are selected from the class consisting of

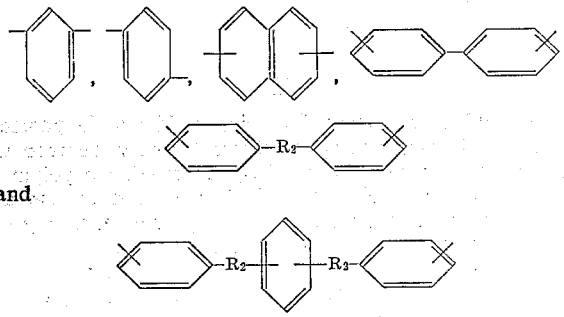

and wherein the $R_2$'s may be the same or different and wherein —$R_2$— is selected from the class consisting of alkylene radicals of from 1 to 3 carbon atoms, —O—, —S—,

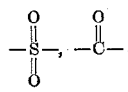

and

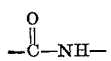

The dianhydrides useful in the present invention generally have the structural formula

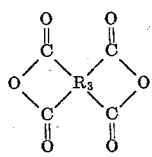

wherein

is a tetravalent aromatic radical. Preferred tetravalent aromatic radicals for use as

are

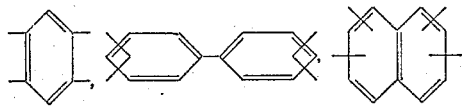

and

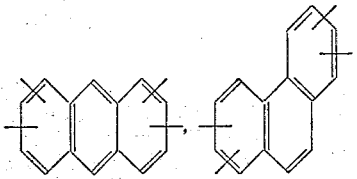

wherein —$R_4$— is selected from the class consisting of —O—,

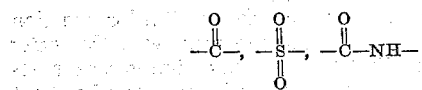

and alkylene radicals of from 1–3 carbon atoms, wherein the bonds to the carbonyl groups are in pairs, with the carbonyl groups in each pair being attached to adjacent carbon atoms of a ring.

The reactants in the imidizer normally are maintained at from 100 to 200° C. Above 200° C. the polymer tends to precipitate too rapidly for high molecular weight polymer to be formed, while below 100° C. the conversion goes too slowly.

Preferably the reaction mixture in the imidizer is agitated either by boiling of the liquid medium in the imidizer or by mechanical agitation. Either form of agitation helps to prevent formation of a skin on the walls of the imidizer as well as to promote the formation of finely divided particles of polyimide. The particles of polyimide, produced by the process of the present invention, are characterized by having surface areas of at least 0.1 square meter per gram, usually above 1 and preferably from 2 to 500 square meters/gram. The surface area is measured by adsorption of nitrogen from a gas stream of nitrogen and helium at liquid nitrogen temperature, using the technique described by F. M. Nelsen and F. T. Eggertsen (Anal. Chem. 30, 1387 (1958)). Sample weights are in the order of 0.1–3.0 g. The thermal conductivity detector is maintained at 40° C. and the flow rate of gas is approximately 50 ml./min. The gas mixture used is 10 parts by weight nitrogen and 90 parts by weight helium. Samples are purged with the nitrogen-helium mixture at room temperature. Adsorption peaks are generally used for the determinations, since tailing effects are more pronounced upon desorption. Calculations of surface area are done as described by Nelsen and Eggertsen. The values of surface area obtained correspond closely to values obtained using the classical B.E.T. Method (S. Brunauer, P. H. Emmett and E. Teller, J.A.C.S. 60, 309 (1938)).

The tensile properties as reported herein are measured on tensile bars using the test procedure of ASTM D–1708. The bars are prepared by compacting the resin at 100,000 p.s.i. in a standard test bar mold of the American Powder Metallurgy Institute and then heating the compacted resin in a nitrogen environment to coalesce the particles. The heating cycle will vary with the choice of resin and typically is 12 hours at 300–320° C. followed by slow heating at 1° C. per minute to 450° C. which is maintained for 10 minutes.

DESCRIPTION OF THE PREFERRED EMBODIMENTS

Example I

A solution of the polyamide acid (PAA) from pyromellitic dianhydride (PMDA) and 4,4'-oxydianiline (ODA) is prepared by dissolving 176.21 g. (0.880 mole) ODA in 1429 ml. dry pyridine at 40° C. and adding 174.50 g. (0.800 mole) PMDA. The reaction mixture is stirred 30 minutes, and the resulting PAA solution, which is 20 percent solids by weight, has a solution viscosity at room temperature of 31.3 poises as measured by a Brookfield viscometer (Model RVT) and an inherent viscosity of 0.43 as measured at a concentration of 0.5 g./100 ml. in N,N-dimethylacetamide at 35° C. (which corresponds to 0.40 as measured from a 0.5 percent solution in pyridine at 35° C.). The excess ODA present corresponds to a 10 mole percent monomer imbalance. The PAA solution is divided in half and converted to polyimide powder as follows:

A) A 4-necked, 3-1, round bottom flask is fitted with an air-driven paddle stirrer, dropping funnel, distillation head, and stopper. Polyamide acid solution (524 g.) is charged to the dropping funnel and pyridine (1500 ml.) to the imidizing flask. The pyridine is heated with stirring to reflux temperature using an oil bath, and the polyamide acid is added slowly in 71 minutes. During the addition, about 500 ml. of the pyridine is distilled from the reaction flask to maintain the reaction volume approximately constant and to reduce the effect of water produced during imidization. The slurry which forms is heated at reflux for 3 hours, allowed to cool, filtered through a medium frit sintered glass Buchner funnel and displacement washed with a volume of acetone about twice the volume of the filter cake. The polymer is then dried at 150° C. in a vacuum oven with nitrogen bleed overnight. The soft yellow lumps are broken up in a Wiley mill to a powder which is found to have a specific surface area of 113 m.$^2$/g. The powder is coalesced into tensile bars having a tensile strength of 1,150 p.s.i. and elongation of 0.5 percent.

(B) The same apparatus as in (A) is employed for a coupling polymerization except the stopper is replaced with a stcond dropping funnel. Polyamide acid solution (539 g.) is charged to one dropping funnel and pyridine (1500 ml.) to the imidizing flask. A 10 percent solution of PMDA is prepared by dissolving PMDA (5.36 g.) in pyridine (49 ml.) in the second dropping funnel. The quantity of PMDA is sufficient to reduce the monomer imbalance of the polyamide acid used to about 0 percent (stoichiometric). The pyridine is heated with stirring to reflux temperature using an oil bath, and the polyamide acid and PMDA solutions are added simultaneously in 59 minutes. The rate of addition of PMDA solution is about 1/10 that of the PAA solution to achieve close to 0 percent monomer imbalance in the system throughout the addition. Pyridine is removed simultaneously to maintain the reaction volume approximately constant and to reduce the effects of water produced during imidization. The slurry which forms is heated at reflux for 3 hours, allowed to cool, filtered through a medium frit sintered glass Buchner funnel and displacement washed with a volume of acetone about twice the volume of the filter cake. The polymer, dried and processed as in (A) has a specific surface area of 82 m.$^2$/g. The tensile strength after coalescing is 10,500 p.s.i. and elongation 8.2 percent. To obtain these same tensile properties without the coupling process, the original PAA must have an inherent viscosity of about 1.6 and a monomer imbalance of about 1 percent.

Example II

The procedure of Example I(B) is followed using a sample of polyamide acid (PAA) solution made from pyromellitic dianhydride (PMDA) and 4,4'-oxydianiline (ODA) in pyridine as the solvent on a 15 percent solids basis and at a monomer imbalance of 2.5 mole percent excess ODA. This PAA has an inherent viscosity of 0.91 (0.81 as measured from a 0.5 percent solution in pyridine at 35° C.). The time for the addition of the PAA and PMDA solutions is 63 minutes. The polyimide product is characterized by a specific surface area of 101 m.$^2$/g., a tensile strength after coalescing of 12,500 p.s.i. and elongation of 13.5 percent. These properties are those expected of a polyimide made from a polyamide-acid having an inherent viscosity of about 2.9 and monomer imbalance of excess ODA of about 0.4 mole percent.

Example III

Example II is repeated with a sample of the same PAA solution except that pyridine is not distilled from the reaction mixture during addition of the PAA and PMDA solutions, and the slurry is heated at the reflux temperature of pyridine for only 2 hours. The polyimide product is characterized by a specific surface area of 102 m.$^2$/g., a tensile strength after coalescing of 12,200 p.s.i. and elongation of 8.7 percent. These properties are those expected of a polyimide made from a PAA having an inherent viscosity of about 1.9 and a monomer imbalance of excess ODA of about 0.8 mole percent.

Example IV

A polyamide acid (PAA) solution containing 15 percent solids is prepared by mixing 29.0011 g. 3,3',4,4'-benzophenone tetracarboxylic dianhydride (BTDA) with a solution of 10.8146 g. m-phenylene diamine (MPD) in 230 ml. pyridine. The inherent viscosity of this PAA, measured as in Example I, is 0.31 (0.29 as measured from a 0.5 percent solution in pyridine at 35° C.), and there is a 10 mole percent excess of diamine. A solution of 3.5446 g. BTDA in 69.5 ml. pyridine is prepared, a quantity of BTDA which is 10 percent more than that needed to bring the PAA to 0 percent imbalance. The two solutions are added to 200 ml. refluxing pyridine over a 52 minute period at relative rates such that an approximate 1:1 ratio of MPD to BTDA is maintained in the imidizing flask. Polyimide precipitation begins about 66 minutes after the additions are started. The slurry is heated at the reflux temperature of pyridine for 4⅔ hours, and the product is obtained as a yellow powder after working up as in Example I. The powder has a specific surface area of 195 m.$^2$/g. and tensile properties after coalescing of 9.800 p.s.i. tensile strength and 2.1 percent. elongation.

Example V

A polyamide acid (PAA) solution containing 10 percent solids is prepared by mixing 43.63 g. pyromellitic dianhydride (PMDA) with a solution of 80.10 g. 4,4'-oxydianiline (ODA) in 1134 ml. dry pyridine. The inherent viscosity of this PAA, measured at a concentration of 0.5 g./100 ml. in pyridine at 35° C. is 0.14, and there is a 100 mole percent excess of diamine. A solution of 43.63 g. PMDA in 400 ml. dry pyridine is prepared, a quantity of PMDA which is sufficient to bring the PAA to 0 percent imbalance. The two solutions are added to 1000 ml. refluxing pyridine over an 84 minute period at relative rates such that an approximate 1:1 ratio of ODA to PMDA is maintained in the imidizing flask. Simultaneously with the addition of the PAA and PMDA solutions, pyridine is distilled from the imidizing flask with a total of 750 ml. being removed. Precipitation of polyimide begins in about 37–41 minutes after the additions are started. The slurry is heated at the reflux temperature of pyridine for 3 hours, and the product is obtained as a yellow powder after working up as in Example I. The powder has a specific surface area of 91 m.$^2$/g. and tensile properties after coalescing of 12,400 p.s.i. tensile strength and 11.6 percent elongation. These properties are those expected from a PAA having an inherent viscosity of about 2.9 and monomer imbalance of excess ODA of about 0.4 mole percent.

Example VI

A polyamide acid (PAA) solution containing 10 percent solids is prepared by mixing 64.45 g. 3,3',4,4'-benzophenone tetracarboxylic dianhydride (BTDA) with a solution of 80.10 g. 4,4'-oxydianiline (ODA) in 1325 ml. dry pyridine. The inherent viscosity of this PAA, measured at a concentration of 0.5 g./100 ml. pyridine at 35° C. is 0.14 and there is a 100 mole percent excess of diamine. A solution of 43.63 g. pyromellitic dianhydride (PMDA) in 40 ml. dry pyridine is prepared, a quantity of PMDA which is sufficient to bring the PAA to 0 percent imbalance. The two solutions are added to 1000 ml. refluxing pyridine over a 108 minute period at relative rates such that an approximate 1:1 ratio of amine to anhydride groups is maintained in the imidizing flask. Simultaneously with the addition of the PAA and PMDA solutions, pyridine is distilled from the imidizing flask with a total of 825 ml. being removed. Precipitation of polyimide begins in about 88 minutes after the additions are started and the surry is heated at the reflux temperature of pyridine for 3 hours after the additions are complete. For ease in handling the slurry is diluted with 500 ml. dry pyridine and the product obtained is rather hard yellow chunks after working up as in Example I. The powder has a specific surface area of 11 m.$^2$/g. and tensile properties after coalescing of 9160 p.s.i. tensile strength and 2.3 percent elongation.

Example VII

Two monomer solutions are prepared by dissolving 40.05 g. 4,4'-oxydianiline (ODA) in 400 ml. dry pyridine and 43.63 g. pyromellitic dianhydride (PMDA) in 400 ml. dry pyridine. These solutions are added simultaneously at equal rates to 500 ml. of refluxing pyridine, thus maintaining an approximate 1:1 monomer ratio in the 1 liter reaction vessel. Concurrently, pyridine is distilled from the reactor to remove water formed during imidization and provide space for the incoming solutions. Precipitation of the polyimide begins in about 29 minutes from the start of monomer additions, a time when approximately half of the monomers have been added. Removal of pyridine via distillation is somewhat slower than monomer addition which is slowed accordingly. A total of 117 minutes is used for monomer addition and a total of 675 ml. of distilled pyridine is removed. The slurry is refluxed for 3 hours after monomer addition is completed and the product is worked up as in Example I to produce a yellow powder. This powder has a specific surface area of 114 m.$^2$/g. and tensile properties after coalescing of 13,500 p.s.i. tensile strength and 11.9 percent elongation. These properties are those which could be expected from a polyamide acid made from these monomers having an inherent viscosity of at least 4.0 and monomer imbalance of less than 0.2 mole percent excess ODA. This example illustrates the in situ preparation of the polyamide-acid while imidization is occurring.

I claim:

1. A process for the production of coalescible powders of high molecular weight aromatic polyimides comprising the step of imidizing at from 100 to 200 C. a polyamide-acid having an inherent viscosity of less than 1 as measured in a 0.5 percent solution in pyridine at 35° C., the polyamide-acid being formed from at least one arylene diamine monomer and at least one aromatic tetracarboxylic dianhydride monomer, at least one monomer being present in the imidizing step in an amount sufficient to maintain a ratio of anhydride to amine at within 1.5 percent of 1:1, and recovering a coalescible aromatic polyimide powder having a surface area of at least 0.1 square meter per gram.

2. The process of claim 1 wherein the polyamide-acid is preformed and is formed from an arylene diamine and and aromatic dianhydride wherein one of these monomers is used in at least a 2 mole percent excess as based on the other monomer.

3. The process of claim 2 wherein the diamine has the structural formula H$_2$N—R$_1$—NH$_2$ wherein R$_1$ is selected from the class consisting of

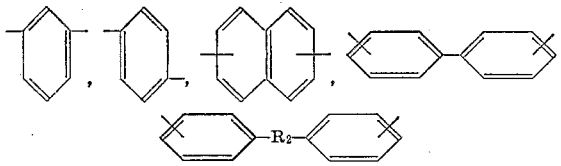

and

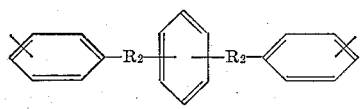

wherein —R$_2$— is selected from the class consisting of alkylene radicals of from 1 to 3 carbon atoms, —O—, —S—,

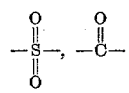

and

4. The process of claim 3 wherein the dianhydride has the structural formula

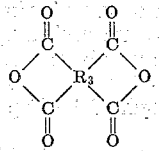

wherein R$_3$ is an aromatic radical selected from the class consisting of

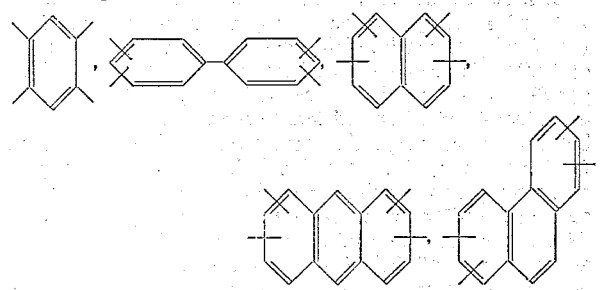

and

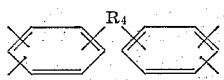

wherein —R$_4$— is selected from the class consisting of —O—,

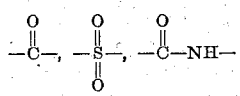

and alkylene radicals of from 1 to 3 carbon atoms, wherein the bonds to the carbonyl groups are in pairs, with the carbonyl groups in each pair being attached to adjacent carbon atoms of a ring.

5. The process of claim 4 wherein the dianhydride is pyromellitic dianhydride.

6. The process of claim 4 wherein R$_3$ is

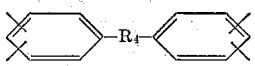

7. The process of claim 5 wherein R$_1$ is

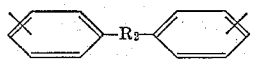

8. The process of claim 6 wherein the R$_1$ is

9. The process of claim 8 wherein R$_4$ is

10. The process of claim 7 wherein R$_2$ is —O—.

References Cited

UNITED STATES PATENTS 3,249,588  5/1966  Gall _____ 260—47
3,422,061  1/1969  Gall _____ 260—47
3,422,064  1/1969  Gall _____ 260—47

WILLIAM H. SHORT, Primary Examiner

L. L. LEE, Assistant Examiner

U.S. Cl. X.R.

260—65, 78